United States Patent Office 3,152,441
Patented Oct. 13, 1964

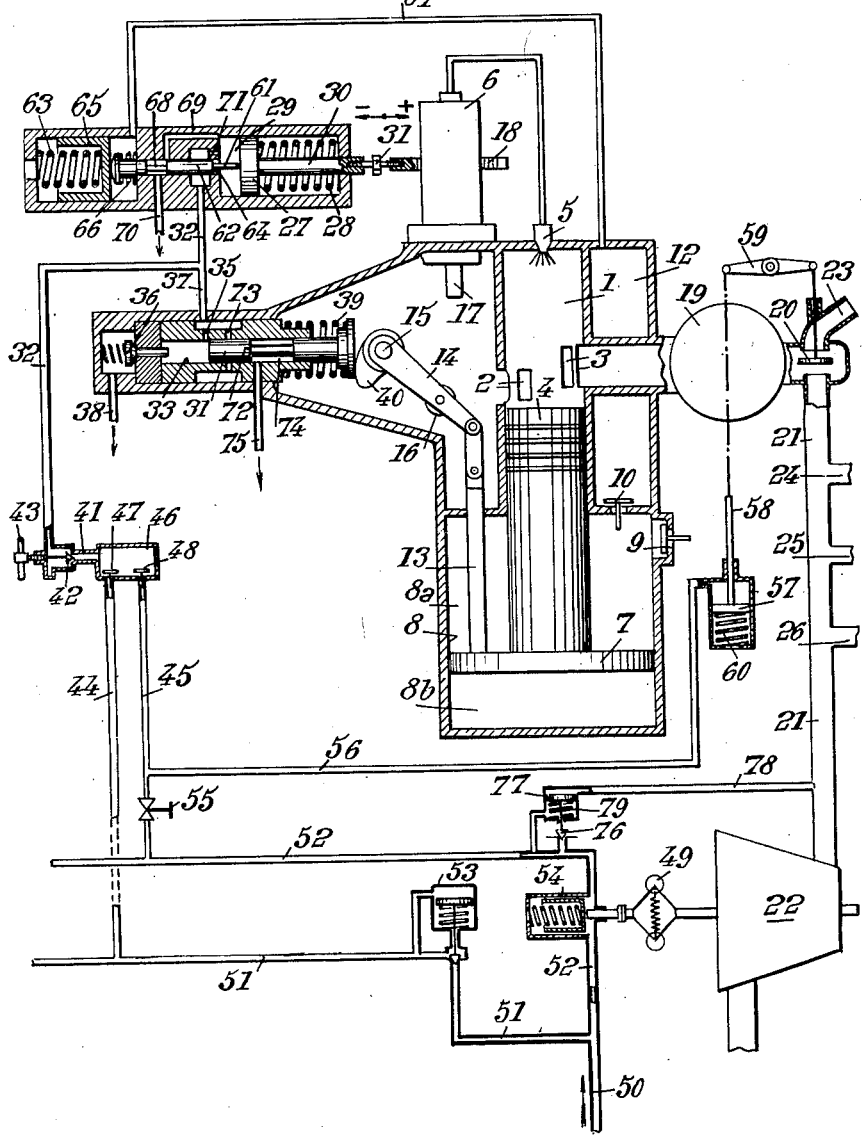

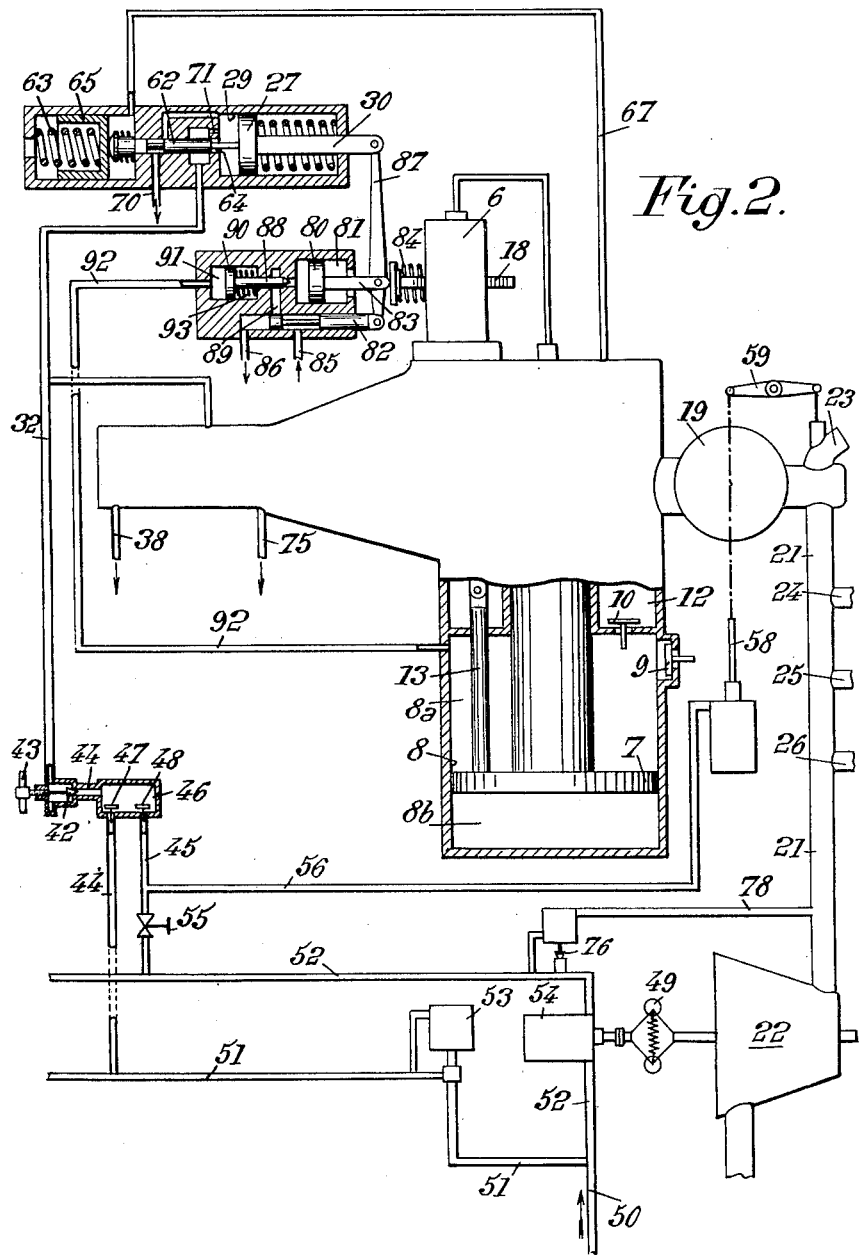

3,152,441
POWER PLANTS COMPRISING AT LEAST ONE
FREE-PISTON ENGINE GENERATING GAS UN-
DER PRESSURE AND A DRIVEN MACHINE,
SUCH AS A TURBINE
Robert Huber, Bellevue, France, assignor to Societe
d'Etudes et de Participations Eau, Gaz, Electricite,
Energie, S.A., Geneva, Switzerland, a Swiss society
Filed Oct. 15, 1962, Ser. No. 230,516
Claims priority, application France, Nov. 9, 1961,
878,477
12 Claims. (Cl. 60—13)

The present invention relates to a power plant of the type comprising at least one free-piston engine generating gas under pressure and a machine, such as a turbine, arranged to be driven by the gas, and it concerns more particularly, but not exclusively plants of the type referred to in which the free-piston engine is a piston gas-generator delivering hot gases under pressure consisting of a mixture of air under pressure and incompletely expanded combustion gases; and it concerns more particularly still among gas-generator plants, those in which a plurality of gas generators feed the same turbine.

One of the objects of the present invention is to provide a direct control of the outer dead point of the free piston or pistons in such power plant.

According to the present invention a power plant of the type set forth comprises means for by-passing, at low loads on the driven machine, some of the gas generated by the engine, and means for automatically regulating the quantity of fuel introduced into the combustion cylinder of the engine, on the one hand, at low loads on the driven machine, in dependence upon the position of the outer dead point reached by the free piston at the end of its combustion strokes, and, on the other hand, for higher loads on the driven machine in dependence both upon the load on the driven machine and also upon the position of the outer dead point.

Preferred embodiments of the invention will be hereinafter described with reference to the appended drawings, given merely by way of example, and in which:

FIG. 1 diagrammatically shows a plant constructed in accordance with the invention, only one of the gas-generators with its fuel regulating means being shown in this figure.

FIG. 2 shows a modification of the regulating means of a gas-generator forming part of said plant.

FIG. 1 shows a gas-generator the combustion part of which operates on a two stroke cycle according to the Diesel cycle, this combustion part comprising a combustion cylinder 1 provided with inlet parts 2 and exhaust parts 3. In the interior of the cylinder operates a combustion piston 4 forming part of a free piston assembly. In the usual manner, in the vicinity of its outer dead point the combustion piston controls the inlet parts 2 and exhaust parts 3. Furthermore, mounted in the end of the combustion cylinder 1, is a fuel injector 5 fed by an injection pump 6. In addition to the combustion piston 4, the free piston of the engine comprises also a compressor piston 7, operating in a compressor cylinder 8 divided into two compartments 8a and 8b by the piston 7. Compartment 8a forms the actual compression space, which is provided with suction valves 9 through which compressed air is drawn in from the surrounding atmosphere, and delivery valves 10, mounted in a partition 11 separating compartment 8a from a reservoir, or engine-case, 12, which surrounds the combustion chamber 1, and into which is forced the air compressed by piston 7 in compartment 8a, this air serving as air for feeding and scavenging cylinder 1.

The second compartment 8b of compressor cylinder 8 contains an air cushion which stores up the energy of piston 4 when the latter accomplishes its outward stroke (combustion stroke) under the effect of the combustion of fuel in combustion cylinder 1. This air cushion restores this energy to the free-piston assembly 4, 7 during the inward stroke of this piston, where the air in compartment 8a is compressed, this air is fed to reservoir 12, and the combustion air enclosed in combustion cylinder 1 is compressed after piston 4 has closed parts 2 and 3 of this latter cylinder.

Injection pump 6 is driven, for example, by means of a rod 13 fixed to compressor piston 7 and producing a rocking movement of a lever 14, the pivot of which is shown at 15 and which, by means of a roller 16, acts on the end of a push-rod 17 for driving the piston (not shown) of injection pump 6 when the free piston assembly 4, 7 is near its inner dead point. Regulation of the quantity of fuel which pump 6 injects through injector 5 into combustion cylinder 1 every time piston 4 is in the vicinity of this last mentioned dead point, is produced, for example, by means of a rod 18, axially movable under the action of regulation means which will be discussed hereinafter, and producing, for example, a rotation of the piston of pump 6 on its axis. The further this rod 18 is moved to the right (see arrow +), the greater is the quantity of fuel injected per stroke of the free piston, and vice versa.

It must be noted here that a gas-generator having only one free piston has been shown in the drawings and described in the foregoing merely to simplify the description. In practice, as it is known, gas-generators generally comprise two opposed free pistons, the combustion pistons of which work in one and the same combustion cylinder, while their compressor pistons work in compressor cylinders arranged on either side of the combustion cylinder, the reciprocating movements of the opposed free pistons being synchronized by a known synchronization device.

The power gas, flowing out from cylinder 1 as soon as piston 4, during its outward stroke, starts uncovering exhaust parts 3, passes to a reservoir 19, the outlet of which may be connected by means of a valve 20 either to a supply pipe 21 leading said power gas to the inlet of a turbine 22 forming the driven machine of the plant, or to an exhaust pipe 23 called "by-pass pipe," or in the intermediate position of the valve 20 (position shown in FIG. 1) to both pipe 21 and by-pass pipe 23, so that part of the power gas supplied by the gas generator arrives at the turbine, while another part of the gas escapes to the exterior. It should be noted here that the other gas-generators (not shown) for feeding the same turbine 22 are likewise connected to the pipe 21 downstream of their respective valves 20 by pipes 24, 25 and 26 indicated diagrammatically in FIG. 1.

Concerning the regulation of a gas-generator of such a plant, it is known that two operating conditions must be distinguished: the first one is that of no-load operation of the gas-generator and low loads of the latter, corresponding to low loads of the turbine fed by the gas-generator, the pressure of the power gas supplied by the gas-generator being below a predetermined value in this condition, while the other condition is that of higher loads of the gas-generator and turbine, during which the power gas delivered by the gas generator has a pressure above said predetermined value.

Under the first condition, the gas-generator supplies an excess of gas under pressure, which cannot be absorbed by the turbine and which must be suppressed either by exhausting the excess into the surrounding air (condition shown in FIG. 1) or by re-cycling part of the air compressed in the compressor cylinder of the gas-generator toward the suction inlet of the same cylinder. Under the second condition, on the contrary, all the power gas produced by the gas-generator may be absorbed by the turbine without any exhaust into the open air and without any re-cycling.

The power plant which is being described permits a precise regulation of the gas-generators in their two operating stages to be obtained, despite the complications which arise when the same turbine is fed by a substantial number of gas-generators.

In the power plant of FIG. 1, the regulating member 18 is controlled at low turbine loads solely by means of a regulating device operating in dependence upon the position of the outer dead point of the free piston assembly 4, 7, this dead point being reached by this assembly at the end of every combustion stroke, while for higher turbine loads, said member 18 is controlled by the combined effect of a speed governor 49 driven by the turbine and of the aforesaid device operating in dependence upon the outer dead point. Before the time at which the aforesaid combined action commences, governor 49 is advantageously utilized for gradually reducing the by-passed part of the power gas supplied by the gas-generator.

In the embodiment of FIG. 1 I have shown a hydraulic system of regulation in which a control liquid acts on one of the faces of a piston 27, the other face of which is subjected to the action of an opposing spring 28, and which moves inside a cylinder 29. The rod 30 of this piston is connected to the regulating rod 18 of the injection pump 6, preferably by means of a screw adjusting element 31.

The position of piston 27, and consequently that of rod 18, is made dependent upon the difference between on the one hand the quantity, fixed or variable with the turbine speed, of a control fluid supplied by a conduit 32 to cylinder 29 and, on the other hand, the quantity of this same fluid removed from the cylinder 29, this latter quantity varying in dependence upon the outer dead point of the piston assembly 4, 7.

Removing from cylinder 29 a quantity of control fluid dependent upon the outer dead point of the piston assembly 4, 7, a form of reciprocating pump is advantageously employed, comprising a cylinder 33 in which works a piston 34 and which is provided with one or more suction orifices 35, controlled by piston 34, and with a delivery valve 36. The suction orifices 35 communicate either directly with the interior of the cylinder 29 or with the interior of conduit 32 by means of a conduit 37, while the fluid passing the delivery valve 36 can escape through a conduit 38.

The free end of the piston 34 is constantly urged by a spring 39 against a cam 40, which is fast with the above-mentioned lever 14 and which rotates with this lever about pivot 15.

It follows from the form of the cam shown in FIG. 1 that the initial position of piston 34, in which it uncovers the admission orifice or orifices 35 of cylinder 33, is determined by engagement of the free end of this piston against the circular part of the cam, this occurring when the free-piston assembly 4, 7 is not yet in the vicinity of its outer dead point. When the free-piston assembly moves outwardly, the lobe of cam 40 acts on the piston of pump 34, and, after closing of the orifice or orifices 35, moves said piston further towards the end of the cylinder 33 as the outer dead point of the free-piston assembly 4, 7 is also displaced further outwardly. Consequently, the quantity first of all delivered by the piston 34 to the outside through the delivery valve 36, and then the quantity drawn by said piston, on its return stroke, from the cylinder 29 of piston 27 are the larger as free-piston assembly 4, 7 moves more outwardly. If the quantity of control fluid arriving through conduit 32 is constant, further outward displacement of the outer dead point of said free-piston assembly 4, 7 therefore produces a reduction in the quantity of control fluid acting on the piston 27, and consequently a displacement of the latter, and with it of the control rod 18, in the direction for reducing the fuel injected by the pump. Conversely, always assuming a constant quantity of control fluid arriving through conduit 32, if the outer dead point of the assembly 4, 7 is displaced inwardly, the quantity of fluid drawn from the cylinder 29 by the piston 34 decreases, resulting in a movement of the piston 27 and rod 18 in a direction for increasing the quantity of fuel injected by injector 5 into cylinder 1.

It is arranged that as long as valve 20 has not completely closed by-pass pipe 23, the quantity of fluid under pressure arriving through conduit 32 is practically constant, the position of piston 27 and that of regulating rod 18 depending only on the quantity taken by pump 33, 34, that is to say on the outer dead point of the free-piston assembly 4, 7, while, from the moment when valve 20 has completely closed by-pass pipe 23, so that all the power gas produced by the gas generator is supplied by pipe 21 to turbine 22, the quantity of control fluid conveyed through conduit 32 becomes variable as a function of the speed of the turbine 22.

For this purpose, conduit 32 is fed from a conduit 41 of calibrated cross-section, which is adjustable by means of a valve 42 operated by a handwheel 43, either from a conduit 44 or from a conduit 45, both of which open into an enclosure 46. Each of these conduits 44 and 45 is provided, at its opening into enclosure 46, with a non-return valve, these valves being designated respectively by reference numerals 47 and 48. Furthermore, conduit 44 is fed with fluid at substantially constant pressure, while conduit 45 is fed with fluid the pressure of which varies as a function of the speed of turbine 22, this result being obtained by means of speed governor 49 driven by the turbine. The source of fluid under pressure may be the same for both conduits 44 and 45, as shown in FIG. 1. In this case, a conduit 50 coming from the source is provided, and two conduits 51 and 52 are connected to conduit 50. A pressure reducer 53 is inserted in conduit 51 and maintains a practically constant pressure in the length of conduit 51 situated downstream of the reducer. When the plant comprises a plurality of gas-generators, a conduit 51 common to all the gas-generators is provided, and the various conduits 44 are connected to this common conduit 51 downstream of pressure reducer 53. Another pressure reducer 54, controlled by the governor 49 which is driven by turbine 22 is inserted in conduit 52, so that, downstream of this pressure reducer 54, there prevails in this conduit a pressure which increases as the speed of the turbine decreases. In a plant with a plurality of gas-generators, all the conduits 45 of the different gas generators are connected to the length of conduit 52 exending downstream of pressure reducer 54. Preferably, a cock 55 is included in each of these conduits 45. Connected furthermore to the conduit 45 of each of the gas-generators, preferably downstream of cock 55, is a conduit 56 leading the pressure prevailing in conduit 45 to a piston 57, which is connected to valve 20 by a suitable linkage 58, 59, and which brings this valve nearer to the position for closing by-pass pipe 23 as the pressure in conduit 52, and hence in conduits 45 and 56, increases, while an opposing spring 60 acts on piston 57 in the opposite direction.

Pressure reducers 53 and 54 are so adjusted that the pressure in conduits 52 and 56, necessary for bringing the valve 20 to the position for completely closing by-pass pipe 23, is the same as the practically constant pressure prevailing in conduits 51 and 44.

The regulating device described operates as follows:

As long as the turbine is running under no load or is under slight load, the pressure in conduit 52 and hence in conduits 45 and 56 is less than the practically constant pressure prevailing in conduits 51 and 44. Consequently, in this first condition of operation of the plant, conduit 32 receives a practically constant quantity of control fluid through non-return valve 47 and calibrated conduit 41, while non-return valve 48 is closed. The position of piston 27 therefore depends solely on the outer dead point of the free-piston assembly 4, 7. The whole is furthermore so arranged that under this operating condition, said assembly 4, 7 reaches each time a dead point close to the minimum outer dead point, so as to reduce as much as possible the excess of gas to be exhausted through by-pass pipe 23.

During no-load running of the turbine, the pressure in conduits 52, 45 and 56 has its minimum value, the effect of which is that valve 20 is in a position where a very large proportion of the gases delivered by the gas generator escapes through by-pass pipe 23. When the turbine is put under load and as this load increases, the pressure in conduits 52, 45 and 56 also gradually increases, resulting in such movement of valve 20 that the latter gradually opens pipe 21 more and more and closes pipe 23 more and more.

When, under the influence of governor 49, the pressure in conduits 52, 45 and 56 becomes equal to that prevailing in conduits 51 and 44, valve 20 completely closes by-pass 23 and fully opens pipe 21. If the load on the turbine 22 increases still further, the pressure in conduits 52 and 45 becomes higher than that prevailing in conduits 51 and 44, which results in closure of the non-return valve 47 and opening of the non-return valve 48. From this time on and for higher turbine loads, the quantity of control fluid entering conduit 32 depends on the pressure of the control liquid in conduits 52 and 45, this pressure being regulated by governor 49 as a function of the turbine load. The more the load increases, the more does the quantity of control liquid supplied by conduit 32 to cylinder 29 also increase This produces a displacement of piston 27 and control rod 18 in the direction for increasing the quantity of fuel injected into the combustion cylinder 1. This increase results in an increase in length of the stroke of the free-piston assembly and an outward displacement of its outer dead point, together with an increase in the delivery pressure of the gas-generator. The said displacement of the outer dead point in its turn results in an increase in the quantity of control fluid discharged by pump 33, 34. The displacement of piston 27 continues until, for a given load of turbine 22, there is again equilibrium between the quantity of control fluid supplied by conduit 32 and the quantity of control liquid discharged by pump 33, 34. At the same time, a position of piston 27 in its cylinder 29 is reached for which injection pump 6 injects into cylinder 1 the quantity of fuel corresponding to the load on turbine 22.

It follows from the foregoing that under the first condition of operation of turbine 22 (no-load running or running under low load), the outer dead point of the free-piston assembly remains in the vicinity of its minimum outer dead point while under the second condition of operation (higher load), the outer dead point is displaced more and more outwardly as the load on the turbine increases, a given outer dead point corresponding under this latter condition of operation to a given load of the turbine.

By varying the cross-section of the calibrated conduit 41 by means of valve 42, the position of the outer dead point of the free piston may be varied for a given pressure of control liquid.

Although the plant described is satisfatcory in some cases, in other cases certain other arrangements described hereinafter may be adopted.

According to one of these arrangements, means are provided for regulating with precision the position of the member 18 controlling the delivery of the pump for the starting stroke. Said means comprise a stop 61 mounted on the end of a rod 62, this rod being urged by a spring 63 into the position shown in FIG. 1 where it closes an opening 64 interposed between cylinder 29 and conduits 32 and 37. When stop 61 and its rod 62 have the position shown by FIG. 1, piston 27 is withdrawn from the action of the control fluid and occupies the position determined by its engagement against stop 61, which is the starting position.

Spring 63 acts on the end of rod 62 by means of a piston 65, against which the rod is constantly urged by means of a spring 66. On its side opposite to that on which acts spring 63, piston 65 is subjected to a pressure prevailing in the gas-generator after its starting, for example to the pressure in cushion 8b, or as indicated in FIG. 1, to the pressure prevailing in casing 12, which is led to below piston 65 through a conduit 67. Consequently, after starting of the gas-generator, piston 65 is pushed toward the left, which also produces a movement toward the left of stop 61 and its rod 62, releasing piston 27 and uncovering opening 64. Consequently the control fluid can now act on piston 27 in the above-described manner.

For the regulating device to operate correctly from the starting stroke, it is important that the circuit of the control liquid should be perfectly vented, even on stoppage of the gas-generator. For this reason, means are provided for connecting the circuit containing the control liquid to the atmosphere on stoppage of the gas-generator. Preferably, for controlling this communication with the atmosphere, use is made of rod 62, which for this purpose is adapted as a distributor by providing a groove 68 in said rod. Furthermore, opening into the wall of the housing of rod 62, on the one hand is one of the ends of a conduit 69 the other end of which opens in the cylider 29, and on the other hand is one of the ends of a conduit 70, the other end of which passes to the outside. Finally, in the partition in which said opening 64 is provided, another calibrated opening 71 is constantly open.

When the gas-generator is stopped and consequently rod 62 is in the position shown in FIG. 1, groove 68 connects conduit 69 to conduit 70. Furthermore, even on stoppage, there is always a certain flow of liquid through calibrated opening 71. On starting, rod 62 closes communication between conduits 69 and 70 so that the normal operation of the regulating device is not impeded.

According to another arrangement, the regulating device provides progressively acting safety means in the case where the free-piston assembly overshoots the admissible maximum outer dead point. In the case of such over-shooting, the rear edge 72 of piston 34 uncovers a series of holes 73 provided in the wall of cylinder 33 and, by means of a groove 74, puts these holes into communication with a conduit 75 open to the atmosphere. Consequently, when the maximum outer dead point is overshot, some of the control liquid escapes through said conduit 75, which produces a displacement of control rod 18 in the direction for reducing the quantity of fuel injected. The quantity of control liquid which may thus escape is the greater as the free-piston assembly overshoots more and more the limit position of the outer dead point, which produces a corresponding backward movement of piston 27.

It follows that, in the plant described, the outer dead point of the free-piston assembly depends under the second condition of operation (higher load) upon the pressure of the control liquid in conduits 52 and 45 and not upon the working pressure of the gas-generator. In a free-piston gas-generator, however, to avoid overloading the combustion cylinder, it is advantageous to reduce the possibility of the free-pistons reaching their maximum strokes as long as the working pressures are below the maximum pressure. For this purpose a limit may be fixed for the pressure in conduits 52 and 45, which limit is variable as a function of the pressure of the power gas. In order to effect this limitation, there is advantageously provided, on conduit 52, an exhaust valve 76 held upon its seat by a force which increases as the pressure of the power gas feeding turbine 22 increases. Advantageously, therefore, valve 76 is connected to a piston 77, subjected on one side to the pressure in pipe 21 which is admitted to said piston 77 through a conduit 78, while on its opposite side said piston 77 is subjected to the action of the pressure prevailing in conduit 52 and to the action of a spring 79.

In the regulating device described, arrival of the control liquid through calibrated conduit 41 is continuous, while discharge of this liquid by pump 33, 34 is periodical. This results in a periodical variation of the volume in conduit 32 and in cylinder 29, which produces an oscillation of piston 27 and control rod 18. This oscillation may be troublesome for the behaviour of the pump, and it is usually important to reduce it as much as possible. One means of reducing the amplitude of this oscillation is to increase the time required for feeding pump 33, 34 by checking the admission of control liquid to the cylinder 33 of this pump. This checking may be effected by making the admission orifice 35 of reduced section. Consequently, during the feed period of the pump, only the difference between the delivery of calibrated conduit 41 and the delivery through admission orifice 35 of reduced section displaces the piston 27.

To reduce still further the oscillations of piston 27 and control rod 18, another arrangement shown in FIG. 2 is advantageously employed.

In this arrangement, piston 27, instead of acting directly on the control rod 18 of pump 6, is arranged to control the slide-valve of a servo-motor, which in its turn produces the movement of rod 18. This servo-motor comprises a piston 80 moving in a cylinder 81 and controlled by a slide-valve 82. The rod 83 of piston 80, which is connected to the control rod 18 of the pump, is urged by a spring 84 toward the left in FIG. 2, that is to say in a direction which produces a reduction in the fuel delivered by pump 6, while piston 80 is urged in the opposed direction by a servo-motor liquid arriving through a conduit 85 and adapted to be discharged through a conduit 86. Arrival of this servo-motor liquid and discharge thereof are controlled by slide-valve 82, which is connected to piston 27 by means of a double-armed lever 87, this lever being pivoted to piston rod 83. Furthermore, a shut-off needle valve 88 is interposed in the conduit 89 which connects the inside of cylinder 81 to the housing of slide-valve 82. This shut-off valve is controlled by a piston 90 moving in a cylinder 91. In the direction for closing valve 88, piston 90 is subjected to the pressure prevailing in the compressor cylinder (chamber 8a) of the gas-generator, this pressure being conveyed by a conduit 92, while piston 90 is subjected to the action of a spring 93 in the opening direction of valve 88.

Oscillations of the piston 27 are transmitted to the slide-valve 82, which controls the admission of servo-motor fluid to, and its outlet from, cylinder 81. Conduit 89, however, is periodically closed and opened by valve 88, since as long as a pressure higher than atmospheric pressure prevails in the compressor cylinder, piston 90 is urged toward the right and closes valve 88. This valve opens only during the suction period of the compressor cylinder (chamber 8a) of the gas-generator and hence during the period for which no force is transmitted to the injection pump. It is during this short period that the servo-motor liquid, controlled by slide-valve 82 can enter cylinder 81 or can be discharged from this cylinder to the outside. It is therefore during this short period also that piston 80 can move the control rod 18 of pump 6. The oscillatory movement of this rod 18 and the wear which could result therefrom are thus avoided.

In a general manner while I have, in the above description, disclosed what I deem to be a practical and efficient embodiment of my invention, I do not wish to be limited thereto as there might be changes made in the arrangement, disposition and form of the parts without departing from the principle of my invention as comprehended within the scope of the appended claims.

What I claim is:

1. A power plant which comprises, in combination, an internal combustion engine for producing gas under pressure, said engine comprising a combustion cylinder and at least one free piston movable in said cylinder between an inner dead point position and an outer dead point position, said engine having an exhaust conduit, a gas driven machine adapted to be operated by the gas from said engine, an inlet conduit leading to the inlet of said driven machine, a by-pass pipe opening to the outside, valve means mounted in said exhaust conduit for controlling the distribution of exhaust gas therefrom between said by-pass pipe and said inlet conduit, said valve means being capable of closing said by-pass pipe, an adjustable feed pump for feeding fuel to said engine, a regulating member for controlling said feed pump to determine the amount of fuel fed to said engine on every stroke of said piston, means responsive to variation of said outer dead stroke position for controlling said regulating member, means responsive to variation of the load of said driven machine for controlling said regulating member, said last mentioned means being operative only for values of said load above a given minimum, and means operatively connected with said valve means and responsive to variation of the load of said driven machine for bringing said valve means from by-pass pipe opening position to by-pass pipe closing position in response to an increase of said load to said minimum value.

2. A power plant which comprises, in combination, an internal combustion engine for producing gas under pressure, said engine comprising a combustion cylinder and at least one free piston movable in said cylinder between an inner dead point position and an outer dead point position, said engine having an exhaust conduit, a gas turbine to be driven by the exhaust gas from said internal combustion engine, an inlet conduit leading to the inlet of said turbine, a by-pass pipe opening to the outside, a valve in said exhaust conduit to control the distribution of exhaust gas therefrom between said by-pass pipe and said inlet conduit, said valve means being capable of closing said by-pass pipe, an adjustable pump for feeding fuel to said internal combustion engine, a liquid operated regulating device for controlling the adjustment of said feed pump to determine the amount of fuel fed to said engine on every stroke of said piston, first feed means operative by said gas turbine for feeding said regulating device with liquid at a pressure variable according to the load of said turbine, second feed means for feeding said regulating device with liquid at a constant pressure equal to the minimum value of the pressure of the liquid of fed by said first feed means, a discharge pump device having its inlet in communication with said feed means, means for operating said discharge pump device in response to the variations of said outer dead point position to control the discharge of liquid from said regulating device produced by said discharge pump device in accordance with the position of said outer dead point and means operatively connected with said valve and responsive to variations of the pressure in said first feed means for brining said valve from by-pass pipe opening position to by-pass pipe closing position in response to the flow of liquid at said higher pressure through said first feed means.

3. A power plant according to claim 2 wherein said means for operating said discharge pump comprise a cam operatively connected with said engine free piston.

4. A power plant which comprises, in combination, an internal combustion engine for producing gas under pressure, said engine comprising a combustion cylinder and at least one free piston movable in said cylinder between an inner dead point position and an outer dead point position, said engine having an exhaust conduit, a gas turbine to be driven by the exhaust gas from said internal combustion engine, an inlet conduit leading to the inlet of said turbine, a by-pass pipe opening to the outside, a valve in said exhaust conduit to control the distribution of exhaust gas therefrom between said by-pass pipe and said inlet conduit, said valve means being capable of closing said by-pass pipe, an adjustable pump for feeding fuel to said internal combustion engine, a liquid operated regulating device for controlling said feed pump to determine the amount of fuel fed to said engine on every stroke of said piston, a liquid feed pipe for supplying liquid to said regulating device, said feed pipe comprising a calibrated portion, means forming an enclosure in communication with said feed pipe upstream of said calibrated portion, two liquid feed conduits, a first one and a second one, opening into said enclosure, check valves in said conduits, respectively, mounted for opening toward said enclosure, means for supplying the first of said feed conduits with liquid at a pressure of a value variable according to the load of said turbine, means for supplying the second of said feed conduits with liquid at a constant pressure equal to the minimum value of the pressure of the liquid fed through said first mentioned feed conduit, a discharge pump device having its inlet in communication with said feed pipe, means for operating said discharge pump device in response to the variations of said outer dead point position to control the discharge of liquid from said regulating device through said discharge pump device in accordance with the position of said outer dead point, and means operatively connected with said valve and responsive to variations of the pressure in said first feed conduit for bringing said valve from by-pass pipe opening position to by-pass pipe closing position in response to the opening of the check valve provided in said first feed conduit.

5. A power plant according to claim 4 wherein the last mentioned means comprises a piston operatively connected with said valve and a cylinder adapted to cooperate with said piston and communicating with said first feed conduit.

6. A power plant which comprises, in combination, an internal combustion engine for producing gas under pressure, said engine comprising a combustion cylinder and at least one free piston movable in said cylinder between an inner dead point position and an outer dead point position, said engine having an exhaust conduit, a gas turbine to be driven by the exhaust gas from said internal combustion engine, an inlet conduit leading to the inlet of said turbine, a by-pass pipe opening to the outside, a valve in said exhaust conduit to control the distribution of exhaust gas therefrom between said by-pass pipe and said inlet conduit, said valve means being capable of closing said by-pass pipe, an adjustable pump for feeding fuel to said internal combustion engine, a liquid operated regulating device for controlling the adjustment of said feed pump to determine the amount of fuel fed to said engine on every stroke of said piston, first feed means operative by said gas turbine for feeding said regulating device with liquid at a pressure variable according to the load of said turbine, a second feed means for feeding said regulating device with liquid at a constant presure equal to the minimum value of the pressure of the liquid fed by said first feed means, a discharge pump device having its inlet in communication with said feed means, means for operating said discharge pump device in response to the variations of said outer dead point position to control the discharge of liquid from said regulating device produced by said discharge pump device in accordance with the position of said outer dead point, means operatively connected with said valve and responsive to variations of the pressure in said first feed means for bringing said valve from by-pass pipe opening position to by-pass pipe closing position in response to the flow of liquid at said higher pressure through said first feed means and abutment means adapted to cooperate with said regulating member when said engine is at rest for setting said regulating member in the position corresponding to the starting of said engine and means operative by said engine for retracting said abutment means from active position with respect to said regulating member as soon as said engine has been started.

7. A power plant according to claim 6 wherein said regulating device comprises a casing and a piston slidable in said casing and forming therewith a variable volume chamber the variation of volume of which operates said regulating device, said casing including a cavity in communication with said feed means and a longitudinal communication passage between said cavity and said variable volume chamber, and a slide valve rigid with said abutment means and slidable in said passage for closing it when said abutment means is in active position.

8. A power plant according to claim 6 wherein said regulating device comprises a casing and a piston slidable in said casing and forming therewith a variable volume chamber the variation of volume of which operates said regulating device, and cooperating means carried respectively by said last mentioned piston and said casing for placing said variable volume chamber in communication with the outside when said engine is at rest.

9. A power plant according to claim 2 further including means operative by said discharge pump device for placing said discharge pump device into discharge position when said engine free piston moves beyond a given extreme outer dead point position.

10. A power plant according to claim 2 further including, a discharge valve in said first feed conduit, and means responsive to variation of the fluid pressure at the inlet of said turbine for opposing the opening of said last mentioned valve.

11. A power plant according to claim 2 further including means for braking the inflow of liquid to said discharge pump device.

12. A power plant according to claim 2 wherein said liquid operated regulating device for controlling said feed pump comprises a servo-motor operatively connected with said feed pump for controlling the adjustment thereof, and means operative by said liquid feed means for operating said servo-motor, said servo-motor being capable of acting on said pump only during the suction strokes of said free piston.

References Cited in the file of this patent
UNITED STATES PATENTS 2,779,156    Huber _____ Jan. 29, 1957
2,960,818    Horgen _____ Nov. 22, 1960